United States Patent Office 3,745,023
Patented July 10, 1973

3,745,023
COMPOSITIONS FOR ENHANCING FLAVOR OF PET FOODS
Jack Greenberg, Richmond, Va., and Lawrence S. Spiegel, Andover, Mass., assignors to Robins, A. H., Company, Incorporated, Richmond, Va.
No Drawing. Continuation-in-part of application Ser. No. 743,045, July 8, 1968. This application Feb. 5, 1971, Ser. No. 113,061
Int. Cl. A23k 1/00; A23l 1/26
U.S. Cl. 99—140 R
1 Claim

ABSTRACT OF THE DISCLOSURE

Food flavoring and appetite enhancing stable clear liquid compositions containing modified animal fat extracts, vegetable oils and other flavoring additives which may be applied to commercially available pet foods in the form of clear liquids, emulsions, and aerosol sprays to enhance the flavor of the pet food.

The present invention relates to pet food flavoring and pet appetite enhancing compositions. The compositions of the present invention are comprised of modified lower melting land-animal fat extracts, vegetable oils with and without marine oils and flavors, said compositions being in the form of stable clear liquids and emulsions of the clear liquids.

This application is a continuation-in-part of copending application Ser. No. 743,045, filed July 8, 1968, now abandoned.

One of the more difficult aspects of pet care and management is that of feeding. Difficulties may arise in the following situations.

(1) Young puppy dogs or cats, following the weaning process or after being fed infantile types of diet, as for example, one high in milk content, may not accept the commercial preparations available as normal pet foods.

(2) Dogs and cats generally have poor acceptance of dry type cereal-based foods. Such products are the least expensive as well as being a convenient means of feeding pets. However, they suffer from low acceptability and in some cases must be mixed with meat-based canned foods or scraps to enhance the flavor. Obviously, this eliminates the features of convenience and economy of dry-type pet foods.

(3) Dogs or cats boarded in a commercial kennel or unfamiliar surroundings almost invariably offer feeding problems. This response may be greatly intensified with post operative, ill or otherwise distressed animals.

(4) Cats, in particular, are known to be difficult to feed under normal conditions. Abnormal social or physiological conditions may tremendously intensify this problem.

(5) There are special training, handling and show conditions under which highly flavored treats or rewards are required.

The unmodified or crude animal fat extract which serves as a starting material for the compositions of this invention is the equivalent of a rendered fat selected from one or more of chicken, beef, mutton and other land-animal fats suitable for consumption by cats and dogs.

It is well known that cats and dogs are essentially carnivorous animals. Although they have adjusted to the commercially available mixed foods prepared from a variety of vegetable and cereal combinations, preference still remains for animal flavor.

An important element in animal tissue is the flavor of the fat. Fat flavor is influenced by the type of protein tissue and reflects the nature of the fat itself. It can be demonstrated that crude fat extracts carry the oil soluble flavor constituency of the tissue source. For example, rendered bacon and chicken fats have a strong characteristic aroma and taste. In many cases, the flavor associated with the food is the flavor of the fat. Lean chicken meat will have less "chicken" flavor than fat rendered from the skin or leaf fat. Crude fat extracts have characteristic aromas which are more intensely perceived by animals than by humans.

The basis of this invention is the discovery that an admixture of unmodified animal fat extract and vegetable oil can be cooled to precipitate hard fats while retaining flavors and aromas, free fatty acids and unsaturated values in homogeneous, elegantly clear, stable solution. Additive flavors and antioxidants are added at low level to finish the preparation of compositions of this invention, thus further elevating the appetite appeal of pet foods to which the said compositions are added. A further embodiment is that elimination of the hard fat in itself contributes to flavor enhancement.

The term "modified animal fat extract" as used herein in the concept of the immediate foregoing, therefore, refers to the low melting animal fat portion of crude land-animal fat extract retained in the compositions of this invention having substantially the flavor and aroma elements of the original animal fat and a substantial amount of the free fatty acids which contribute to the flavor and aroma. Fatty acids of varying chemical compositions are retained and each makes its contribution to flavor and aroma.

Vegetable oil is unhydrogenated oil from one or more selected from the group of corn, peanut, cottonseed, soybean, safflower and other edible vegetable oils of commerce. Minor additive flavors of garlic and anise oil are preferred; however, other herb flavors may be used. A preferred antioxidant is butylated hydroxyanisole.

One serious drawback to the direct application of unmodified crude animal fat extracts onto pet foods is the presence of hard stearin precipitates (saturated and higher melting fats) which tend to segregate in containers and which makes it difficult to dispense the fat. Furthermore, these stearin precipitates being more or less depleted in taste with aromas being trapped within the pasty solids and, consequently, less appetizing to cats and dogs, tend to strain out on the surface of the pet food to which it is applied, making the whole somewhat less appetizing in taste and appearance. In cool weather unmodified crude extracts tend to solidfy completely, making it impossible to pour from a container. In any case, the condition is worsened by storage below normal temperatures during which times precipitation becomes severe.

The primary object of this invention is, therefore, to provide homogeneous, elegantly-clear liquid pet food flavor-enhancing compositions derived in substantial part from modified animal fat extracts having retained the aroma and flavor of the fat and which remain stable and clear and free of precipitated solids over a wide temperature range.

Another object of this invention is to provide animal fat and vegetable oil combinations high in unsaturated animal and vegetable fats for their pharmaceutical properties. Not only are distressed animals induced to eat more food and to improve health-wise but conditions and appearance of skin and hair is greatly improved, particularly in cases where deterioration of skin and hair condition has been a problem. As there is no limit to the amount of flavor-enhancing composition which may be applied on a temporary basis, amounts may be increased to meet the need of the situation.

A further object is to provide a pet food flavor-enhancing composition which when dispensed on pet food will penetrate the food, thus obviating the need for mixing said flavor-enhancing composition with pet food. No unappetizing precipitates, slurries or films are deposited on the food when the compositions of this invention are applied.

Still other objects are to provide emulsions and aerosol compositions as alternate means of applying the flavor-enhancing compositions.

These and other objects will become apparent to one skilled in the art.

The objects of this invention are accomplished by mixing crude water-washed animal fat extracts, vegetable oil, added flavors, antioxidants, with and without fish oil, cooling the mixture to about 45° F. until hard fats are substantially precipitated and removing said animal fats by a suitable means such as filtration or centrifugation and obtaining clear liquid compositions of this invention. Flavor and antioxidant may also be added after precipitation rather than before. Hard animal fats are those higher melting fats, chiefly glycerides of palmitic and stearic acid, while the lower melting oils as retained in our compositions are largely the glycerides of oleic acid and glycerides of shorter chain fatty acids. As illustrated in the examples, some allowance must be made for vegetable oils retained on the discard filter cake. The modification of the crude animal fat extract is thus brought about by elimination of higher melting hard fats from mixtures of our compositions. As stated above, the crude fat is water washed, which removes dirt and pieces of meat. Conventional processing of animal fats includes caustic washing, but for compositions of our invention this step must be avoided as it would remove free fatty acids which are important components of our invention and would also lower the proportion of unsaturated components. Free fatty acids usually amount to 3 to 10% of remaining animal fat in the compositions and contribute heavily to the flavor and aroma of said compositions.

Vegetable oil serves as a solvent for animal fat and free fatty acids as a less expensive diluent and to supply additional unsaturated fat.

The compositions of this invention have the following desirable characteristics:

(a) the melting point of the compositions are sufficiently low to ensure dispensing as a liquid or aerosol spray through small orifices.

(b) the selected fats are all animal-edible and are available as items of commerce.

(c) the products may be stabilized for long shelf-life by the use of antioxidants.

(d) by proper packaging, the product may be dispensed in small amounts to cover a feeding dish or dry pet food.

(e) minor amounts of other flavors may be added to increase the overall flavor as desired.

The relative proportions of the ingredients may be varied greatly depending on the economics of a given situation and desired flavor characteristic. For example, there may be logistical problems of supply where it is cheaper to obtain chicken fat than beef, etc., in which case a higher ratio of vegetable oil may be used. However, below about 25% by weight modified animal fat the fat flavor is not pronounced enough to sufficiently enhance the flavor of treated foods. In general, when fish oils are not used, modified animal fat extracts of the lower melting fats should comprise 25 to 74.9 parts by weight of the composition, vegetable oils from 25 to 74.9 parts by weight and 0.1 to 1.0 part by weight added flavors and antioxidants. Preferably, however, when fish oil is absent, 35 to 64.9 parts by weight of said modified animal fat extracts are used with from 35 to 64.9 parts by weight vegetable oils and 0.1 to 1.0 part by weight added flavors and antioxidants. When fish oils are used, said modified animal fat extracts range from 25 to 72 parts by weight and from 25 to 72 parts by weight vegetable oil. Preferably, when fish oil is used, modified animal fat extracts range from 32 to 65 parts by weight and vegetable oils range from 32 to 65 parts by weight. Fish oil content may range from 2.0 to 20 parts by weight, preferably 2 to 5 parts by weight per 100 parts flavor enhancing composition. Preferably, flavors and antioxidants together range from 0.1 to 0.5 part by weight.

A suitable process for making the clear liquid compositions of this invention is to mix crude animal fat extract, which has been washed with water to remove dirt and pieces of meat, with vegetable oil and other ingredients and to cool the mixture at about 45° F. for 12 to 72 hours to precipitate hard fats and to filter to remove the precipitated fats.

The filter cake amounts to about 50 weight percent of the original weight of the starting crude fat extract and is depleted in unsaturated animal fat. The filtrate contains 3 to 10 weight percent free fatty acids calculated as oleic acid and is rich in unsaturated fats and oils.

The examples below illustrate in some detail some of the compositions which comprise this invention. However, this invention is not to be construed as limited thereby in spirit or in scope. It will be apparent to one skilled in the art that numerous modifications in materials and methods can be adopted without departing from the invention.

EXAMPLE 1

The following mixture in parts by weight:

| | Parts by weight |
|---|---|
| Rendered chicken fat | 90 |
| Rendered beef fat | 5 |
| Rendered pork fat | 5 |
| Crude soybean oil | 69 | is vigorously stirred at room temperature and cooled to 45° F. for several days. The precipitated saturated fats and soybean sludge are filtered off and discarded giving 99 parts of liquid fats and oils and to the filtrate is added one part of other flavor ingredients and antioxidant consisting of oil of garlic, anise oil and butylated hydroxanisole. The composition of the clear liquid filtrate with additives is approximately in parts by weight:

| | Parts by weight |
|---|---|
| Animal fat | 50 |
| Vegetable oil | 49 |
| Flavors and antioxidant | 1 |
| | 100 |

Free fatty acids were found to be 4 weight percent of contained animal fat. Portions of the clear liquid flavor-enhancing composition were stored at various temperatures of 55° F. to 110° F. for several weeks. In each case the filtrate remained stable and clear without developing solids of any kind.

EXAMPLE 2

Following the procedures of Example 1 of mixing, cooling to precipitate saturated fats and centrifuging, a clear liquid filtrate of the following approximate composition in parts by weight was obtained:

| | Parts by weight |
|---|---|
| Animal fat | 48 |
| Fish oil | 2 |
| Vegetable oil | 49 |
| Flavors and antioxidant | 0.1 |

This pet food flavor-enhancing composition remained stable and clear over periods of several weeks at 55° F. to 110° F.

EXAMPLES 3-15

Following the procedures of Example 1 of mixing, cooling to precipitate saturated fats and filtering, clear liquid filtrates of the approximate composition in the following tabulation were obtained:

| Example | Modified animal fats | Vegetable oil | | Fish oil | Flavor and antioxidants |
|---|---|---|---|---|---|
| 3 | 62.5 | 37.4 | S | ---------- | 0.1 |
| 4 | 25.0 | 74.0 | S | ---------- | 1.0 |
| 5 | 35.0 | 64.0 | CTS | ---------- | 1.0 |
| 6 | 35.0 | 50.0 | C | 14.0 | 1.0 |
| 7 | 40.0 | 54.0 | C | 5.0 | 0.1 |
| 8 | 40.0 | 39.0 | P | 20.0 | 1.0 |
| 9 | 60.0 | 34.0 | C | 5.0 | 1.0 |
| 10 | 25.0 | 72.0 | P | 2.0 | 1.0 |
| 11 | 72.0 | 25.0 | S | 2.0 | 1.0 |
| 12 | 65.0 | 32.0 | S | 2.0 | 1.0 |
| 13 | 32.0 | 65.0 | S | 2.0 | 1.0 |
| 14 | 65.0 | 34.0 | C | ---------- | 0.1 |
| 15 | 74.0 | 25.5 | | ---------- | 0.5 |

NOTE.—C=Corn oil; S=Soybean oil; P=Peanut oil; CTS=Cottonseed oil.

Various proportions of beef and pork fats up to 50% starting fats were used, the other 50% being chicken fat. Flavor ingredients were oil of garlic and anise oil. All of these pet-food flavor-enhancing compositions remained stable and clear over periods of several weeks storage at 55° F. to 110° F., no precipitate having been formed. Free fatty acids varied from 3 to 10 weight percent, calculated as oleic acid.

EXAMPLE 16

An aerosol preparation is made in parts by weight:

Product: Parts by weight
Flavor-enhancing composition of Example 1 ___ 93
Propellant carbon dioxide _____ 7 and placed in an aerosol can. The flavor-enhancing composition is dispensed as a clear spray onto the surface of pet foods.

EXAMPLE 17

A blend was made in parts by weight of:

Parts by weight
Flavor-enhancing composition from Example 2 ___ 77.6
Emulsifier _____ 2.4
Water _____ 20.0
                                                100.0 and the mixture was homogenized thoroughly. This may be packed in glass bottles from which the flavor-enhancing composition is readily dispensed.

EXAMPLE 18

A blend was made in parts by weight of:

Parts by weight
Flavor-enhancing composition from Example 2 ___ 90.2
Emulsifier _____ 2.8 and the mixture homogenized thoroughly. This mixture is packed according to the following formula in parts by weight and dispensed from an aerosol can.

Parts by weight
Foregoing emulsion _____ 93
Freon propellant _____ 7

The mixture emerges from the can as a foam and may be so applied to pet foods.

We claim:
1. A clear liquid composition for enhancing the flavor of pet foods comprising on a parts per hundred weight basis, as least 25 and up to 74.9 parts modified animal fat extract, 25 to 74.9 parts unhydrogenated vegetable oils, 0 to 20 parts fish oil, said composition obtained by cooling a mixture of crude water washed animal fat, unhydrogenated vegetable oil and any fish oil used to 45° F. and separating the resultant said clear liquid composition therefrom.

References Cited
UNITED STATES PATENTS
2,921,853  1/1960  Card et al. _____ 99—2
3,600,187  8/1971  Elenbogen _____ 99—2
3,549,386  12/1970  Menzies et al. _____ 99—118

OTHER REFERENCES

Morrison: Feeds and Feeding, 22nd ed., Morrison Publishing Co., Ithaca, N.Y. (1957), pp. 82–85.

MORRIS O. WOLK, Primary Examiner

S. MARANTZ, Assistant Examiner

U.S. Cl. X.R.

99—2 R, 2 F, 118